(12) United States Patent
Kim et al.

(10) Patent No.: US 10,713,764 B2
(45) Date of Patent: Jul. 14, 2020

(54) METHOD AND APPARATUS FOR CONTROLLING IMAGE DATA

(71) Applicant: Samsung Electronics Co., Ltd., Suwon-si, Gyeonggi-do (KR)

(72) Inventors: Dong-Yeon Kim, Seoul (KR); Sung-Ryeul Rhyu, Yongin-si (KR); Eric Yip, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 15/579,805

(22) PCT Filed: Jun. 3, 2016

(86) PCT No.: PCT/KR2016/005930
§ 371 (c)(1),
(2) Date: Dec. 5, 2017

(87) PCT Pub. No.: WO2016/195428
PCT Pub. Date: Dec. 8, 2016

(65) Prior Publication Data
US 2018/0165801 A1  Jun. 14, 2018

(30) Foreign Application Priority Data
Jun. 5, 2015  (KR) .................. 10-2015-0080128

(51) Int. Cl.
*H04N 5/355* (2011.01)
*H04N 9/64* (2006.01)
(Continued)

(52) U.S. Cl.
CPC .............. *G06T 5/009* (2013.01); *G06T 5/008* (2013.01); *G06T 5/40* (2013.01); *G06T 7/80* (2017.01); *H04N 5/355* (2013.01); *H04N 5/57* (2013.01); *H04N 9/64* (2013.01); *G06T 2207/20208* (2013.01)

(58) Field of Classification Search
CPC ........... G06T 5/009; G06T 7/80; G06T 5/008
See application file for complete search history.

(56) References Cited

U.S. PATENT DOCUMENTS 9,979,894 B1 * 5/2018 Kokemohr ........... H04N 13/207
2003/0234785 A1 * 12/2003 Matsuda ................. H04N 5/74
345/426
(Continued)

FOREIGN PATENT DOCUMENTS

EP  1743301 B1  10/2012
JP  2014-160253 A  9/2014
(Continued)

*Primary Examiner* — Santiago Garcia
(74) *Attorney, Agent, or Firm* — Jefferson IP Law, LLP

(57) ABSTRACT

A method for controlling brightness of an image according to the present disclosure comprises the steps of: determining a light source area on the basis of a light signal intensity of pixels included in the image; determining a surrounding area of the light source area in a predetermined manner; and compensating the brightness property of at least one of the light source area and the surrounding area on the basis of at least one of the property of the image, the property of a display device, or property of the surrounding environment.

13 Claims, 6 Drawing Sheets

(51) Int. Cl.
   *H04N 5/57*   (2006.01)
   *G06T 7/80*   (2017.01)
   *G06T 5/40*   (2006.01)
   *G06T 5/00*   (2006.01)

(56) References Cited

U.S. PATENT DOCUMENTS

| | | | | |
|---|---|---|---|---|
| 2006/0059513 A1* | 3/2006 | Tang | .................. | H04N 5/44591 |
| | | | | 725/37 |
| 2009/0201245 A1* | 8/2009 | Nonaka | ............. | G02F 1/133621 |
| | | | | 345/102 |
| 2009/0251562 A1* | 10/2009 | Ikeda | ..................... | H04N 5/217 |
| | | | | 348/223.1 |
| 2010/0085361 A1 | 4/2010 | Kim et al. | | |
| 2011/0193896 A1* | 8/2011 | Johnson | .................. | G06T 5/009 |
| | | | | 345/690 |
| 2011/0292246 A1* | 12/2011 | Brunner | .................. | G06T 5/009 |
| | | | | 348/231.99 |
| 2012/0051635 A1* | 3/2012 | Kunkel | ................... | G06T 5/009 |
| | | | | 382/165 |
| 2012/0075435 A1* | 3/2012 | Hovanky | ............... | H04N 13/20 |
| | | | | 348/51 |
| 2013/0021498 A1* | 1/2013 | Murasawa | ............ | H04N 5/142 |
| | | | | 348/234 |
| 2013/0286253 A1 | 10/2013 | Moon et al. | | |
| 2014/0167619 A1* | 6/2014 | Land | .......................... | G01J 1/44 |
| | | | | 315/152 |
| 2015/0070376 A1* | 3/2015 | Fujine | ..................... | H04N 5/20 |
| | | | | 345/589 |
| 2015/0098709 A1* | 4/2015 | Breuer | ..................... | G01C 3/08 |
| | | | | 398/118 |
| 2015/0124067 A1* | 5/2015 | Bala | ..................... | A61B 5/6898 |
| | | | | 348/77 |
| 2015/0357483 A1* | 12/2015 | Lin | ..................... | H01L 31/0203 |
| | | | | 250/239 |
| 2015/0365689 A1* | 12/2015 | Bae | ..................... | H04N 19/186 |
| | | | | 382/166 |
| 2016/0310027 A1* | 10/2016 | Han | ..................... | A61B 5/02427 |
| 2016/0345040 A1 | 11/2016 | Oh et al. | | |
| 2017/0186222 A1* | 6/2017 | Hata | ..................... | H04N 5/23219 |

FOREIGN PATENT DOCUMENTS

| | | |
|---|---|---|
| KR | 10-2010-0039664 A | 4/2010 |
| KR | 10-2014-0020464 A | 2/2014 |
| KR | 10-2014-0059386 A | 5/2014 |
| WO | 2015-076608 A1 | 5/2015 |

* cited by examiner

METHOD AND APPARATUS FOR CONTROLLING IMAGE DATA

CROSS-REFERENCE TO RELATED APPLICATION(S)

This application is a U.S. National Stage application under 35 U.S.C. § 371 of an International application filed on Jun. 3, 2016 and assigned application number PCT/KR2016/005930, which claimed the benefit of a Korean patent application filed on Jun. 5, 2015 in the Korean Intellectual Property Office and assigned Serial number 10-2015-0080128, the entire disclosure of each of which is hereby incorporated by reference.

TECHNICAL FIELD

The present disclosure relates to a method and an apparatus for controlling the luminance of image data.

BACKGROUND ART

Generally, when the peak luminance of original image data is higher than the peak luminance of a display device, the original image data may be converted in accordance with the peak luminance of the display device so that the original image data can be displayed on various display devices having different levels of peak luminance. An operation of converting the peak luminance of original image data in accordance with the peak luminance of a display device is called tone mapping.

A High-Dynamic-Range (HDR) technique is a scheme for generating optimal image data by generating a plurality of image data having different levels of luminance in one scene and by composing the plurality of image data. For example, in one scene including subjects having a wide range of luminance, such as a scene in which the sun in the bright sky coexists with a dark hill in the shadows, images with moderate luminance in each of the respective subjects are selected and composed using the HDR technique, thereby expressing both the bright sky and the dark hill with appropriate luminance in a single image.

DISCLOSURE

Technical Problem

When a conventional tone-mapping method is used, one image is displayed differently depending on the peak luminance of a display device.

Further, the lower the peak luminance of the display device is, the more the overall luminance of a displayed image is reduced. In addition, the contrast ratio of an image may be reduced to thus cause a significant change in chroma, thus limiting the range in which luminance can be expressed. This may limit the performance of the display device to which the High-Dynamic-Range (HDR) technique is applied.

An embodiment of the present disclosure provides a method and an apparatus for optimally displaying a broad range of luminance in an image to a user.

An embodiment of the present disclosure provides a method and an apparatus for controlling the luminance characteristics of an image.

An embodiment of the present disclosure provides a method and an apparatus for determining a light source area and a surrounding area of an image.

An embodiment of the present disclosure provides a method and an apparatus for determining a light source threshold for determining a light source area of an image.

An embodiment of the present disclosure provides a method and an apparatus for determining a calibration factor and a calibration value for controlling the luminance characteristic of an image.

Technical Solution

The present disclosure provides a method for controlling the luminance of an image, which includes: determining a light source area based on the light signal strength of pixels in the image; determining a surrounding area of the light source area in a predetermined manner; and calibrating a luminance characteristic of at least one of the light source area and the surrounding area based on at least one of a characteristic of the image, a characteristic of a display device, and a characteristic of a surrounding environment.

The present disclosure provides an apparatus for controlling the luminance of an image, which includes: a signal analysis unit that receives content comprising the image; and an image control unit that determines a light source area based on the light signal strength of pixels in the image, determines a surrounding area around the light source area in a predetermined manner, and calibrates a luminance characteristic of at least one of the light source area and the surrounding area based on at least one of a characteristic of the image, a characteristic of a display device, and a characteristic of a surrounding environment.

MODE FOR CARRYING OUT THE INVENTION

Figure 1:
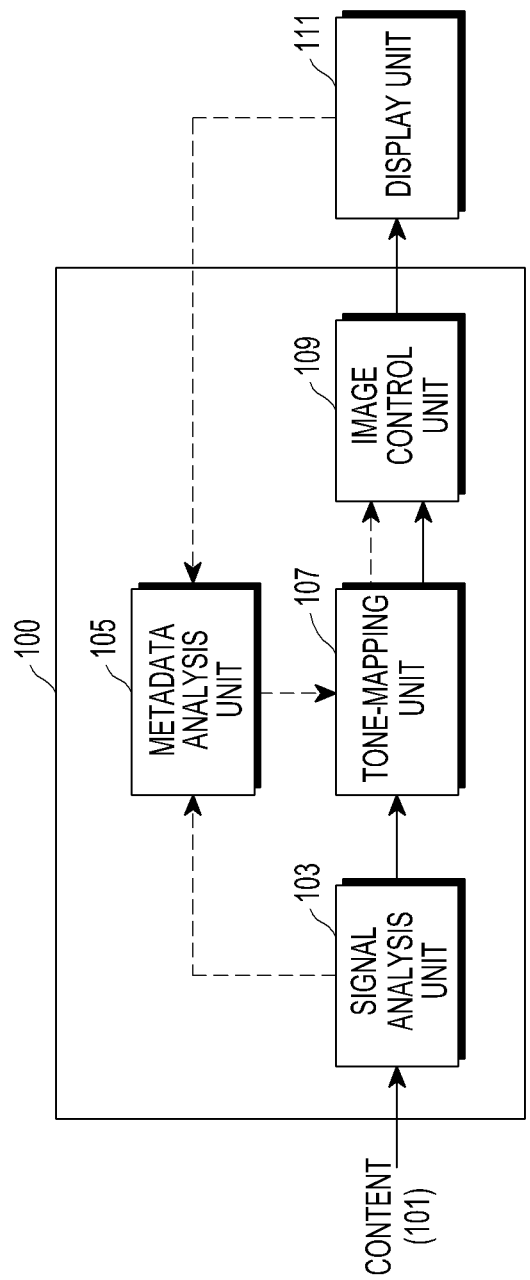
FIG. 1 is a view illustrating the configuration of an image reproduction apparatus according to an embodiment of the present disclosure.

In the following description of the present disclosure, a detailed description of known configurations or functions incorporated herein will be omitted when it is determined that the detailed description may make the subject matter of the present disclosure unnecessarily unclear. Hereinafter, embodiments of the present disclosure will be described in detail with reference to the accompanying drawings.

Although embodiments of the present disclosure described below will be divided for the convenience of description, two or more embodiments may be combined within the range where the embodiments do not collide each other.

The terms as described below are defined in consideration of the functions of the present disclosure, but the meaning of the terms may be changed according to a user, intention of an operator, or convention. Therefore, the terms should be defined on the basis of the contents throughout the specification.

The present disclosure may have various modifications and various embodiments, among which specific embodiments will now be described more fully with reference to the accompanying drawings. However, it should be understood that there is no intent to limit the present disclosure to the particular forms disclosed, but on the contrary, the present disclosure is to cover all modifications, equivalents, and alternatives falling within the spirit and scope of the disclosure.

Although the terms including an ordinal number such as first, second, etc. can be used for describing various elements, the structural elements are not restricted by the terms. The terms are used merely for the purpose to distinguish an element from the other elements. For example, a first element could be termed a second element, and similarly, a second element could be also termed a first element without departing from the scope of the present disclosure. As used herein, the term "and/or" includes any and all combinations of one or more associated items.

The terms used herein are used only to describe particular embodiments, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Prior to the detailed description of the present disclosure, the basic concepts of the present disclosure will be briefly described.

The present disclosure aims to control the luminance of an image in view of at least one of the characteristics of an image, the characteristics of a display device for displaying an image, and the characteristics of the environment surrounding a reproduction device. In particular, the present disclosure determines a light source area and a surrounding area in one image and adjusts the luminance characteristics of the light source area and the surrounding area so as to provide the user with the maximized effect of the light source. For example, by expanding a light source area of an original image and reducing the luminance of a surrounding area of the original image, a light source may be effectively represented in the image.

Based on the aforementioned basic concepts, the present disclosure illustrates a method for determining a light source area, a method for determining a surrounding area, and a method for determining a factor related to the luminance characteristics of the light source area and the surrounding area and the value of the factor in order to control the luminance characteristics.

Hereinafter, the present disclosure will be described in detail with reference to drawings.

FIG. 1 is a view illustrating the configuration of an image reproduction apparatus according to an embodiment of the present disclosure.

Referring to FIG. 1, in the present disclosure, content 101 including image data is input to the image reproduction apparatus 100, and the image reproduction apparatus 100 may decode the image data, may determine a light source area and a surrounding area of a light source in each scene of the image data, and may control the luminance of the image data in view of the luminance characteristics of the light source area and the surrounding area, the characteristics of the content and/or the surrounding environment. Next, the image data is output to a display unit 111 and is displayed. The display unit 111 may be a part of the image reproduction apparatus 100 or may be a separate apparatus connected outside the image reproduction apparatus 111.

Hereinafter, components of the image reproduction apparatus 100 and operations thereof will be described in detail.

In FIG. 1, the content 101 includes image data, such as a movie and Video On Demand (VOD), and includes metadata indicating the characteristics of the content.

For reference, in FIG. 1, the solid line indicates the flow of the image data, and the dotted line indicates the flow of the metadata.

A signal analysis unit 103 analyzes the input content 101, distinguishes the image data from the metadata, transmits the image data to a tone-mapping unit 107, and transmits the metadata to a metadata analysis unit 105.

The metadata analysis unit 105 receives content-related metadata and/or display-related metadata from the signal analysis unit 103. In addition, the metadata analysis unit 105 may receive display-related metadata from the display unit 111. For example, the peak luminance of the display unit 111 is information necessary for tone mapping. When information on the peak luminance of the display unit 111 is not known in advance, the metadata analysis unit 105 may request the display unit 111 to receive the display-related metadata including the information on the peak luminance of the display unit and/or other pieces of information.

The metadata analysis unit 105 receives the received content-related metadata and/or display-related metadata, checks metadata necessary to adjust the luminance of the image data from the received metadata, and transmits the at least one piece of checked metadata to the tone-mapping unit 107.

The metadata necessary to adjust the luminance of the image data and a description thereof are as follows.

(1) Content Peak Luminance: The peak luminance (or brightness) of the image containing the content.

(2) Light Source Identifying Threshold: A threshold for identifying a light source in the image.

(3) Center of Light Source: The position of the center of the light source in the image.

Figure 2A:
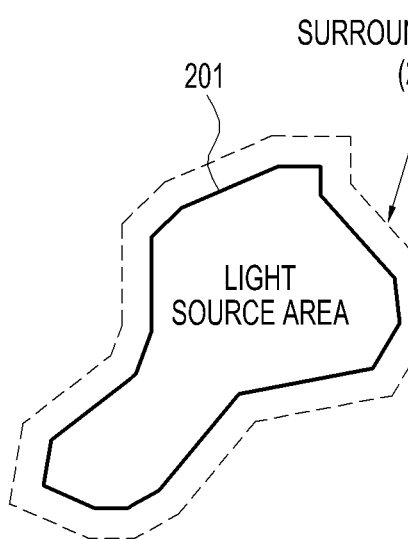
FIGS. 2A and 2B are views illustrating a surrounding type.
Figure 2B:
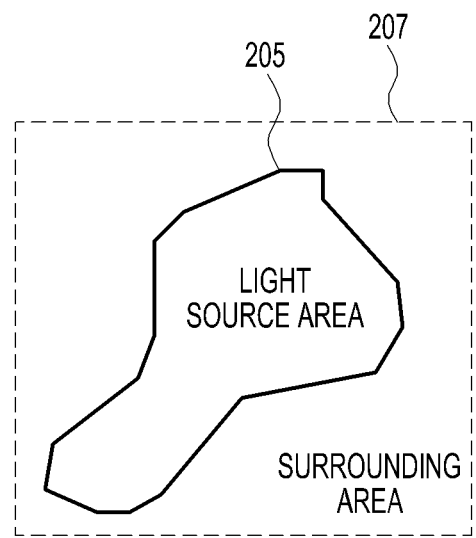

(4) Surrounding Type: The type of a surrounding area that can influence or can be influenced by the luminance of the light source. The surrounding type includes a scale-up type and a window type. Examples of the scale-up type and the window type are shown in FIGS. 2A and 2B. That is, FIG. 2A is an example of the scale-up type and FIG. 2B is an example of the window type. The surrounding type will be mentioned in more detail in the following description.

(5) Scale factor: Information necessary to set the position and size of the surrounding area in the image when the surrounding type is a scale-up type.

(6) Window: Information necessary to set the position and size of the surrounding area in the image when the surround type is a window type.

(7) Display Peak Luminance: The peak luminance of the display unit 111.

For reference, the metadata (1) to (6) may be identified from the content-related metadata, and the metadata (7) may be identified from the display-related metadata.

Referring back to FIG. 1, the tone-mapping unit 107 adjusts the luminance value of the image data based on the metadata transmitted from the metadata analysis unit 105 so that the peak luminance value of the content corresponds to a display peak luminance value. In addition, the tone-mapping unit 107 transmits the metadata necessary to adjust the luminance of the image data to an image control unit 109.

The image control unit 109 detects a light source area and a surrounding area in each scene of the tone-mapped image data and adjusts the luminance of the detected light source area and the detected surrounding area based on the received metadata (that is, the content-related metadata and/or the display-related metadata) or surrounding environment information. For reference, the surrounding environment information may be received from an ambient sensor (not shown in FIG. 1 for convenience). The ambient sensor may detect the surrounding environment information including the ambient luminance of the display unit 111 and may transmit the surrounding environment information to the image control unit 109. Although the metadata have been described as being transmitted from the tone-mapping unit 107, the image control unit 109 may receive the metadata directly from the metadata analysis unit 105.

The light source area refers to an area recognized as a light source on the screen when a user views the image, which is a set of neighboring pixels having similar luminance values among pixels having a luminance value equal to or greater than a predetermined threshold. The internal area connecting the neighboring pixels included in the set may be determined as the light source area. The surrounding area refers to an area around the light source that can influence or can be influenced by the luminance of the light source area.

In the present disclosure, the operation of the image control unit 109 may be broadly divided into five steps.

Figure 3:
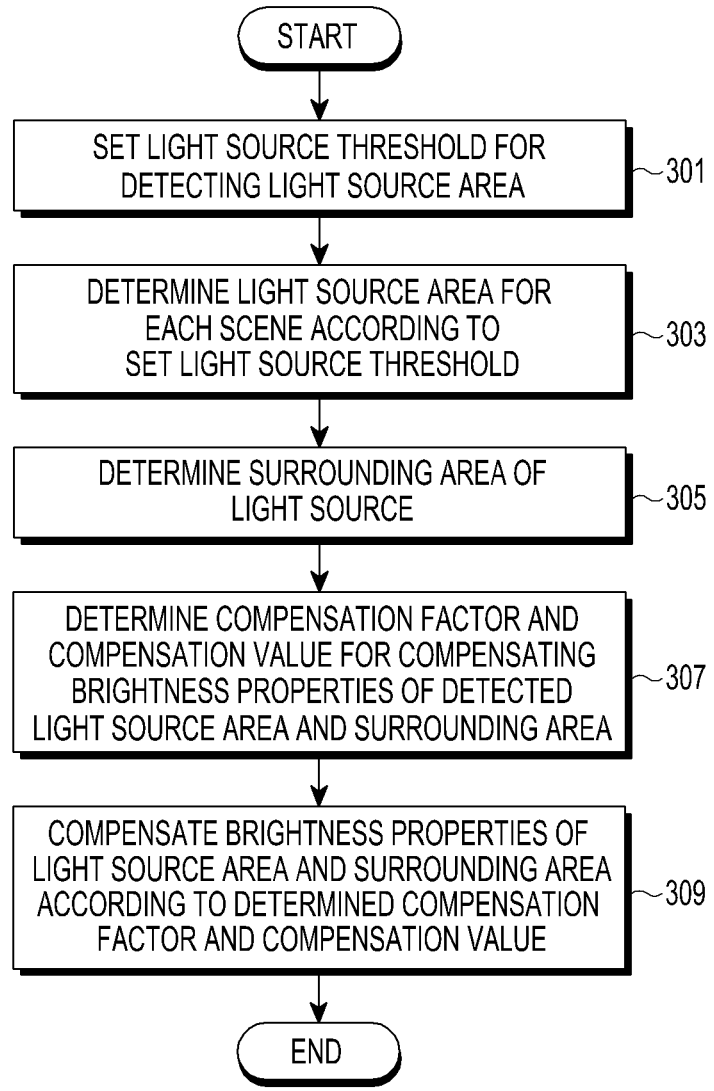
FIG. 3 is a view illustrating an operation of an image control unit according to an embodiment of the present disclosure.

FIG. 3 is a view illustrating the operation of the image control unit 109 according to an embodiment of the present disclosure.

In step 301, the image control unit 109 sets a light source threshold for detecting a light source area.

In step 303, the image control unit 109 detects a light source area in each scene (that is, frame) according to the set light source threshold.

In step 305, the image control unit 109 determines a surrounding area that can influence or can be influenced by the luminance of the light source area.

In step 307, the image control unit 109 determines a calibration factor and a calibration value for calibrating the luminance characteristics of the detected light source area and the surrounding area.

In step 309, the image control unit 109 corrects the luminance characteristics of the light source area and the surrounding area according to the determined calibration factor and calibration value.

In step 301 of FIG. 3, the light source threshold may be set by various methods, examples of which are illustrated below in (a) to (d).

(a) When the light source threshold is included in the content-related metadata or the display-related metadata, the light source threshold is used. That is, the light source threshold may be included in the content or may be included in the display-related metadata received from the display unit 111.

(b) A value obtained by applying a predetermined ratio to the display peak luminance value included in the display-related metadata is used as the light source threshold.

(c) The image control unit 109 obtains a value by applying a predetermined ratio to a representative luminance value representing the entirety, a predetermined section, or each scene of the image data based on a histogram showing the luminance distribution of the entirety, the predetermined section, or each of the scenes of the image data and uses the value as the light source threshold. The representative luminance value may be, for example, an average luminance value.

(d) When the user directly sets a light source threshold and inputs the light source threshold to the image control unit 109, the light source threshold set by the user is used.

In step 303 of FIG. 3, the light source area is determined by the following method.

Figure 4:
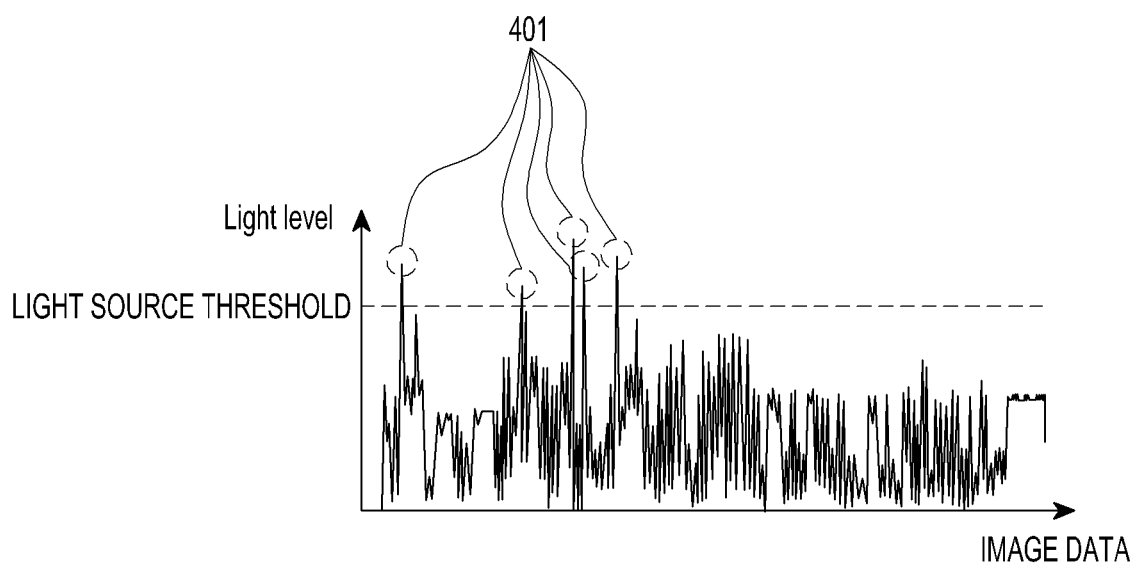
FIG. 4 is a view illustrating an example of distinguishing a light source pixel in an image when a light source threshold is set according to an embodiment of the present disclosure.

The image control unit 109 detects pixels on the screen that have luminance values greater than the light source threshold set by the above methods. FIG. 4 is a view illustrating an example of distinguishing a light source pixel in an image when a light source threshold is set according to an embodiment of the present disclosure. When the light source threshold is set by one of the above methods for setting the light source threshold, light source pixels in which the strength of a light signal is equal to or greater than the light source threshold are identified from among the pixels in the image data for each scene. In FIG. 4, the light source pixels are indicated by reference numeral 401.

Next, adjacent pixels having similar luminance values within a predetermined range among the detected light source pixels are grouped. An internal area connecting the grouped pixels is determined to be one light source area. As such, a plurality of light source pixels may be detected, from which at least one or more light source areas may be detected. Then, the center point of a light source is set with respect to each detected light source.

The details of step 303 may be summarized as follows.

(1) Light source area L: An area connecting a group of neighboring pixels having a similar range of luminance among light source pixels having a luminance value that is equal to or greater than the light source threshold in a screen (2) Center of the light source (C(x, y)): The center point of the light source area In step 305 of FIG. 3, the surrounding area is determined by the following method.

The method for determining the surrounding area may be determined as a scale-up type or a window type.

According to the scale-up type, an area having a size k times that of the light source area based on the center point of the light source may be determined to be the surrounding area. According to the window type, the coordinates of a top left point and a bottom right point may be determined, based on the center point of the light source area, to form a rectangular shape. For reference, the surrounding area may be determined in greater detail using the scale-up type than using the window type. Therefore, the scale-up type may be used to express a detailed image. On the other hand, the window type is simpler than the scale-up type in determining the surrounding area, and thus may be used when quick image processing is needed.

The above method for determining the surrounding area may be summarized as follows.

(1) Surrounding Type: Scale-up type or window type (2) Surrounding area (Surrounding: S): The surrounding area that can influence or can be influenced by the luminance effect of the light source (3) Scale factor (k): A value for setting an area having a size k times the size of the light source based on the center point of the light source as the surrounding area in the scale-up type (4) Window (w): A rectangular surrounding area, defined by a top left point (Xmin, Ymin) and a bottom right point (Xmax, Ymax), in the window type Examples of designation of a surrounding area using the above methods are illustrated in FIGS. 5A and 5B.

Figure 5A:
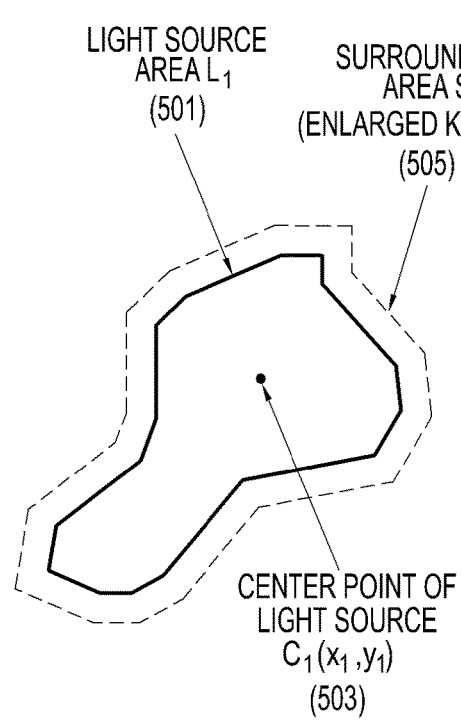
FIGS. 5A and 5B are views illustrating an example of designation of a surrounding area according to an embodiment of the present disclosure.
Figure 5B:
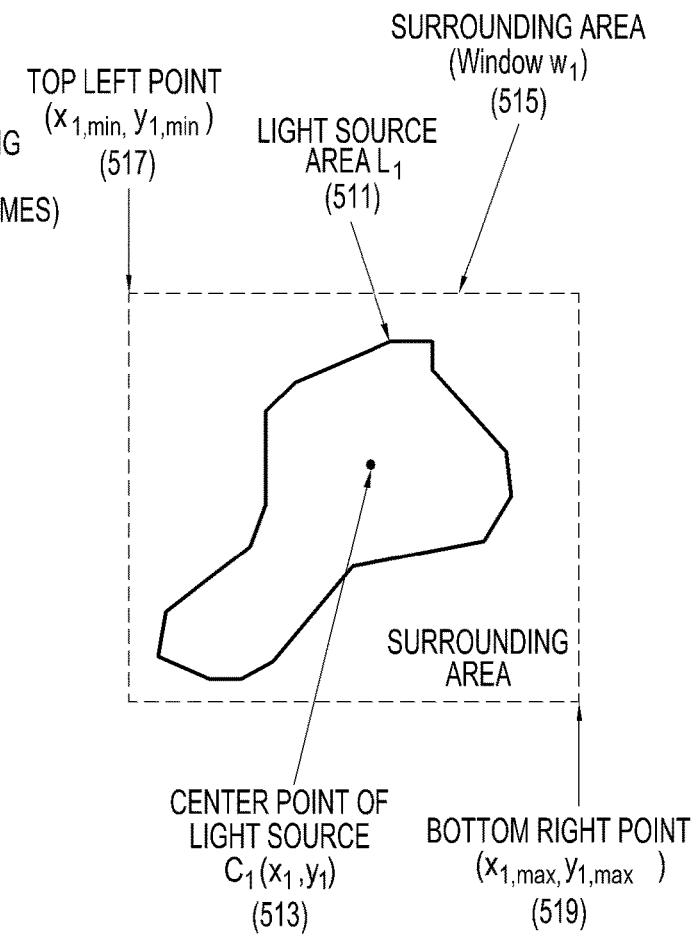

FIGS. 5A and 5B are views illustrating an example of designation of a surrounding area according to an embodiment of the present disclosure.

FIG. 5A illustrates an example of designation of a surrounding area using the scale-up type, in which an area enlarged K times from a light source area 501 based on the center point 503 of a light source of the light source area 501 is designated as a surrounding area 505(?). FIG. 5B illustrates an example of designation of a surrounding area using the window type, in which a surrounding area 515 is designated by a top left point 517 and a bottom right point 519 based on the center point 513 of a light source of the light source area 511.

In step 307 of FIG. 3, the calibration factor and the calibration value for correcting the luminance characteristics of the light source area and the surrounding area are determined by the following method.

The image control unit 109 may determine a calibration value for at least one of factors that influence the luminance effect of the light source area and the surrounding area based on at least one of the content-related metadata, the display-related metadata, and the surrounding environment information.

The factors that influence the luminance effect may include (1) the luminance of the light source, (2) the hue of the light source, (3) the saturation of the light source, (4) the size of the light source, (5) the sharpness of the light source, (6) the luminance of the surrounding area, (7) the hue of the surrounding area, and (8) the saturation of the surrounding area, and the image control unit 109 may determine a calibration value for at least one of the factors.

The method for determining the calibration factor and the calibration value for the image data in the present disclosure may be one of the following examples (1) to (5).

(1) A method of using a calibration factor and a calibration value for the metadata of the content when the metadata includes the calibration factor and the calibration value (2) A method in which the image control unit 109 determines a calibration value in view of the difference between the peak luminance of the content (Content Peak Luminance) and the peak luminance of the display (Display Peak Luminance)

(3) A method in which the image control unit 109 determines a calibration factor and a calibration value based on a histogram showing the luminance distribution of the entirety of the image data, a predetermined section thereof, or each scene thereof (4) A method of using a calibration factor and a calibration value that are set and input directly by a user (5) A method in which, when the image reproduction apparatus includes an ambient sensor, the ambient sensor detects surrounding environment information including the ambient luminance of the display unit 111 and the image control unit 109 receives the surrounding environment information from the ambient sensor and determines a calibration factor and a calibration value based on at least one of the metadata of the content, the metadata of the display unit, and the surrounding environment information.

An example of the method for determining the calibration factor and the calibration value based on the surrounding environment information in (5) is illustrated as follows.

When the reproduction apparatus is in a dark environment, the luminance effect may be exhibited even when the luminance of an image is calibrated at low calibration intensity. On the other hand, when the reproduction apparatus is in a bright environment, the luminance of an image needs to be calibrated at high intensity in order to obtain the effect of luminance calibration. Therefore, if it is possible to detect surrounding environment information, such as information on the ambient luminance of the reproduction apparatus, through an ambient sensor, the image control unit 109 may determine a calibration factor and a calibration value in view of ambient luminance information in addition to the metadata of the content and the metadata of the display unit.

In the present disclosure, the calibration factor and the calibration value may be determined by the aforementioned methods. However, when determining the calibration factor and the calibration value in the present disclosure, the calibration factor and the calibration value may be determined such that the size of the light source area is larger than that of the light source area in the original image and such that the luminance of the surrounding area is lower than the original luminance thereof.

The reasons for increasing the size of the light source area and reducing the luminance of the surrounding area are as follows.

The luminance effect of the light source visually experienced by the user is relative to the luminance of the surrounding area. Therefore, the luminance effect of the light source area may be maximized by adjusting not only the light source area on the screen but also characteristics related to the luminance of the surrounding area. For example, when the luminance of the surrounding area is adjusted to be lower than the actual luminance in the original image, the difference in luminance between the light source area and the surrounding area is increased and the contrast ratio is increased, whereby the user may perceive the light source area to be brighter than it actually is.

Figure 6:
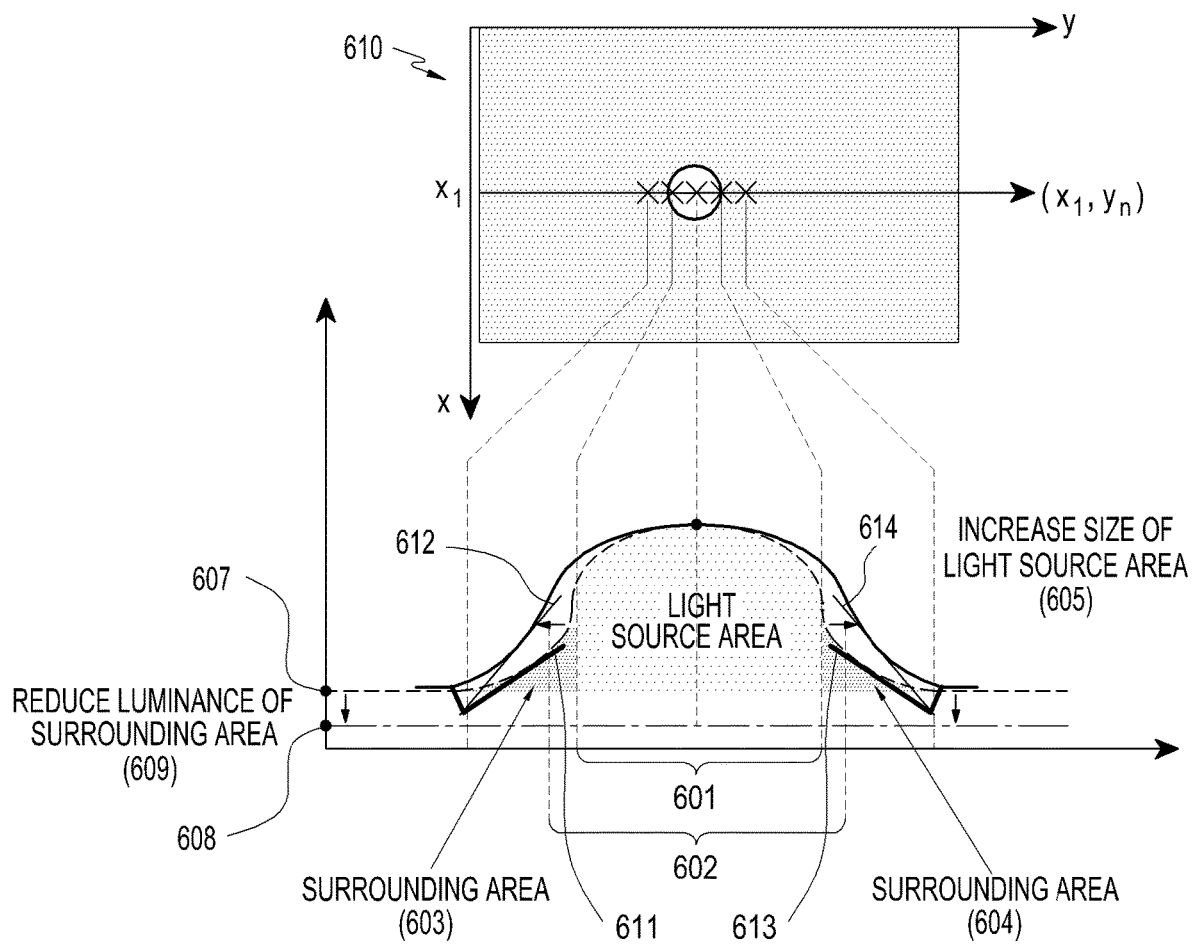
FIG. 6 is a view illustrating an example of a method of adjusting the luminance effect of a light source area and a surrounding area according to an embodiment of the present disclosure.

FIG. 6 is a view illustrating an example of a method of adjusting the luminance effects of a light source area and a surrounding area according to an embodiment of the present disclosure.

In FIG. 6, the luminance effects are adjusted by calibrating the aforementioned factors that influence the luminance effect, (4) the size of the light source, (6) the luminance of the surrounding area, and (5) the sharpness of the light source.

Referring to FIG. 6, after a light source area 601 and surrounding areas 603 and 604 are determined in an original screen 610, the size of a calibrated light source area 602 is increased so as to be greater 605 than the size of the light source area 601 in the original image and the luminance 608 of calibrated surrounding areas is reduced to be lower than the luminance 607 of the surrounding areas in the original image. That is, (4) the size of the light source and (6) the luminance of the surrounding area are adjusted.

Meanwhile, (5) the sharpness of the light source is determined depending on the slope of a line connecting the luminance of a light source area and the luminance of a surrounding area. That is, the greater the difference between the luminance of the light source area and the luminance of the surrounding area grows, the steeper the slope of the line connecting the luminance of the light source area and the luminance of the surrounding area. Referring to FIG. 6, the sharpness slopes 612 and 614 of lines connecting the luminance of the calibrated light source area 602 and the luminance of the calibrated surrounding areas 603 and 604 are steeper than sharpness slopes 611 and 613 before calibration, which means that the sharpness of the calibrated light source area 602 is increased.

Accordingly, it is possible to provide to the user an effect in which the light source area appears to be brighter than it actually is.

According to the image control method proposed in the present disclosure, the luminance effect of an image may be adjusted by calibrating the luminance of a light source area and a surrounding area in the image based on at least one of the characteristics of content, the characteristics of a display device, and the surrounding environment, thereby providing a user with a high-quality image focusing on a light source area and preventing a decrease in HDR performance related to the peak luminance of a display device.

Particular aspects of the present disclosure may be implemented as a computer-readable code in a computer-readable recording medium. The computer-readable recording medium is any data storage device which can store data readable by a computer system. The computer-readable recording medium may include a Read-Only Memory (ROM), a Random-Access Memory (RAM), CD-ROMs, magnetic tapes, floppy disks, optimal data storage devices, and carrier waves (such as data transmission through the Internet). The computer-readable recording medium may be distributed through computer systems connected to the network, and accordingly the computer-readable code is stored and executed in a distributed manner. Further, functional programs, codes and code segments for achieving the present disclosure may be easily interpreted by programmers skilled in the art which the present disclosure pertains to.

It will be understood that a method and apparatus according to an embodiment of the present disclosure may be implemented in the form of hardware, software, or a combination of hardware and software. Any such software may be stored, for example, in a volatile or non-volatile storage device such as a ROM, a memory such as a RAM, a memory chip, a memory device, or a memory IC, or a recordable optical or magnetic medium such as a CD, a DVD, a magnetic disk, or a magnetic tape, regardless of its ability to be erased or its ability to be re-recorded. It can be also appreciated that the memory included in the mobile terminal is one example of machine-readable devices suitable for storing a program including instructions that are executed by a processor device to thereby implement embodiments of the present disclosure.

Accordingly, the present disclosure includes a program for a code implementing the apparatus and method described in the appended claims of the specification and a machine (a computer or the like)-readable storage medium for storing the program. Further, the program may be electronically transferred by a predetermined medium such as a communication signal transferred through a wired or wireless connection, and the present disclosure appropriately includes equivalents of the program.

Further, an apparatus according to an embodiment of the present disclosure may receive the program from a program providing device that is wiredly or wirelessly connected thereto, and may store the program. The program providing device may include a program including instructions through which a program processing device performs a preset content protecting method, a memory for storing information and the like required for the content protecting method, a communication unit for performing wired or wireless communication with the program processing device, and a controller for transmitting the corresponding program to a transceiver at the request of the program processing device or automatically.

The invention claimed is:

1. A method for controlling an image, the method comprising:
    determining a light source area based on a light signal strength of pixels in the image;
    determining a surrounding area around the light source area in a predetermined manner, wherein the surrounding area surrounds a periphery of the light source area;
    detecting an ambient luminance of a surrounding environment using an ambient light sensor; and
    adjusting a luminance characteristic of the light source area and the surrounding area using a calibration value of at least one factor determined based on a characteristic of the image, a characteristic of a display device, and the ambient luminance,
    wherein the at least one factor and the calibration value are determined to increase a size of the light source area to be larger than an actual size of the light source area and reduce a luminance of the surrounding area to be lower than an actual luminance of the surrounding area,
    wherein the determining of the light source area comprises setting a light source threshold, and
    wherein the setting of the light source threshold is determined based on a histogram of image data of the image.

2. The method of claim 1, wherein the determining of the light source area further comprises:
    detecting light source pixels having a light signal strength equal to or greater than the light source threshold;
    grouping adjacent light source pixels having similar luminance values within a predetermined range; and
    determining an area connecting the grouped light source pixels to be the light source area.

3. The method of claim 2, wherein the determining of the surrounding area comprises:
    determining a center point of the light source area; and
    determining the surrounding area based on the center point.

4. The method of claim 1, wherein the adjusting of the luminance characteristic comprises:
    determining the at least one factor related to the luminance characteristic based on at least one of image-related metadata of the image, metadata related to the display device for displaying the image, or surrounding environment information of an image reproduction apparatus; and
    determining the calibration value of the at least one factor.

5. The method of claim 4, wherein the at least one factor comprises at least one of a luminance of the light source area, a hue of the light source area, a saturation of the light source area, a size of the light source area, a sharpness of the light source area, a luminance of the surrounding area, a hue of the surrounding area, or a saturation of the surrounding area.

6. The method of claim 4,
    wherein the at least one factor and the calibration value are included in the image-related metadata of the image or the metadata related to the display device,
    wherein the at least one factor and the calibration value are determined in view of a difference between a peak luminance of the image and a peak luminance of the display device, or
    wherein the at least one factor and the calibration value are determined based on a histogram of the image data, or are determined by an input from a user.

7. An apparatus for controlling an image, the apparatus comprising:
a transceiver configured to receive content comprising the image;
an ambient light sensor; and
a processor configured to:
determine a light source area based on a light signal strength of pixels in the image,
determine a surrounding area around the light source area in a predetermined manner, wherein the surrounding area surrounds a periphery of the light source area,
detect an ambient luminance of a surrounding environment using the ambient light sensor, and
adjust a luminance characteristic of the light source area and the surrounding area using a calibration value of at least one factor determined based on a characteristic of the image, a characteristic of a display device, and the ambient luminance,
wherein the at least one factor and the calibration value are determined to increase a size of the light source area to be larger than an actual size of the light source area and reduce a luminance of the surrounding area to be lower than an actual luminance of the surrounding area,
wherein, to determine the light source area, the processor is further configured to set a light source threshold, and
wherein the light source threshold is determined based on a histogram of image data of the image.

8. The apparatus of claim 7, wherein the processor is further configured to:
detect light source pixels having a light signal strength equal to or greater than the light source threshold,
group adjacent light source pixels having similar luminance values within a predetermined range, and
determine an area connecting the grouped light source pixels to be the light source area.

9. The apparatus of claim 8, wherein the processor is further configured to:
determine a center point of the light source area, and
determine the surrounding area based on the center point.

10. The apparatus of claim 7, wherein the processor is further configured to:
determine the at least one factor related to the luminance characteristic based on at least one of image-related metadata of the image, metadata related to the display device for displaying the image, or surrounding environment information of an image reproduction apparatus, and
determine the calibration value of the at least one factor.

11. The apparatus of claim 10, wherein the at least one factor comprises at least one of a luminance of the light source area, a hue of the light source area, a saturation of the light source area, a size of the light source area, a sharpness of the light source area, a luminance of the surrounding area, a hue of the surrounding area, or a saturation of the surrounding area.

12. The apparatus of claim 10,
wherein the at least one factor and the calibration value are included in the image-related metadata of the image or the metadata related to the display device,
wherein the at least one factor and the calibration value are determined in view of a difference between a peak luminance of the image and a peak luminance of the display device, and
wherein the at least one factor and the calibration value are determined based on a histogram of the image data, or are determined by an input from a user.

13. The method of claim 1, wherein the surrounding area is at least one of a size k times larger than the light source area or is a fixed size which is centered on a center of the light source area.

* * * * *